United States Patent
Choo et al.

(10) Patent No.: US 7,823,270 B2
(45) Date of Patent: Nov. 2, 2010

(54) CLAMP OR CLAMP ASSEMBLY HAVING A LOW PROFILE

(75) Inventors: Victor ChiSiang Choo, Singapore (SG); SiewMing Ng, Singapore (SG); Niroot Jierapipatanakul, Singapore (SG); Pohlye Lirn, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 1181 days.

(21) Appl. No.: 10/791,051

(22) Filed: Mar. 2, 2004

(65) Prior Publication Data
US 2005/0195524 A1    Sep. 8, 2005

(51) Int. Cl.
*G11B 5/127* (2006.01)
*H04R 31/00* (2006.01)

(52) U.S. Cl. .............. 29/603.03; 29/603.04; 29/603.07; 29/469; 360/98.05; 360/99.08; 360/99.12; 360/270; 360/271

(58) Field of Classification Search .............. 29/603.03, 29/603.04, 603.06, 469, 505–509; 360/98.05, 360/99.08, 99.12, 270, 271
See application file for complete search history.

(56) References Cited

U.S. PATENT DOCUMENTS

| | | | |
|---|---|---|---|
| 5,075,808 A | 12/1991 | Johnson | |
| 5,101,306 A | 3/1992 | Johnson | |
| 5,243,481 A | 9/1993 | Dunckley | |
| 5,486,961 A | 1/1996 | Boutaghou | |
| 5,548,457 A | 8/1996 | Brooks | |
| 5,550,690 A | 8/1996 | Boutaghou | |
| 5,590,004 A | 12/1996 | Boutaghou | |
| 6,347,070 B1 | 2/2002 | Fahey | |
| 6,556,376 B1 | 4/2003 | Boutaghou | |
| 6,567,238 B1 | 5/2003 | Renken | |
| 6,594,109 B2 * | 7/2003 | Renken | 360/98.08 |
| 7,215,509 B2 * | 5/2007 | Ng | 360/99.12 |

* cited by examiner

*Primary Examiner*—Paul D Kim
(74) *Attorney, Agent, or Firm*—Westman, Champlin & Kelly, P.A.

(57) ABSTRACT

A clamp including an inverted spring portion and a plurality of tabs about a circumference of an inner portion of the clamp. The inverted spring portion of the clamp is insertable into a groove of a clamping interface between a flange and an outer portion thereof to align the plurality of tabs proximate to the flange. As described, the clamp provides a low profile interface for clamping discs to a spindle assembly which snap fits into the groove to provide a screwless clamp interface. Other features and benefits that characterize embodiments of the present invention will be apparent upon reading the following detailed description and review of the associated drawings.

20 Claims, 6 Drawing Sheets

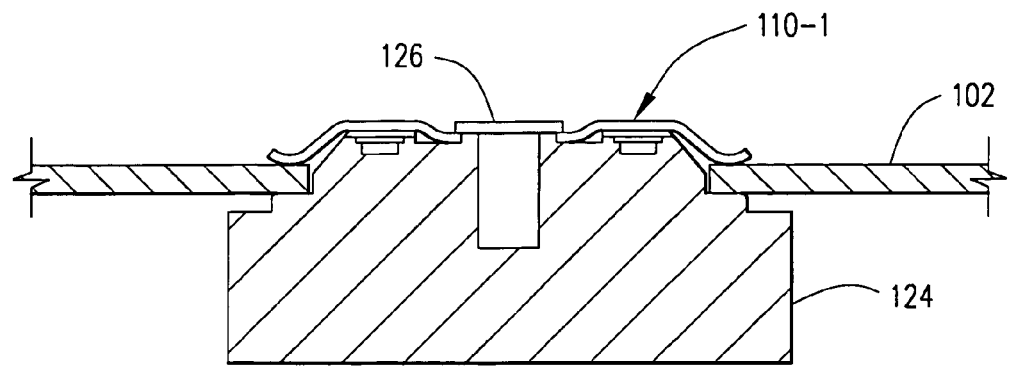
PRIOR ART
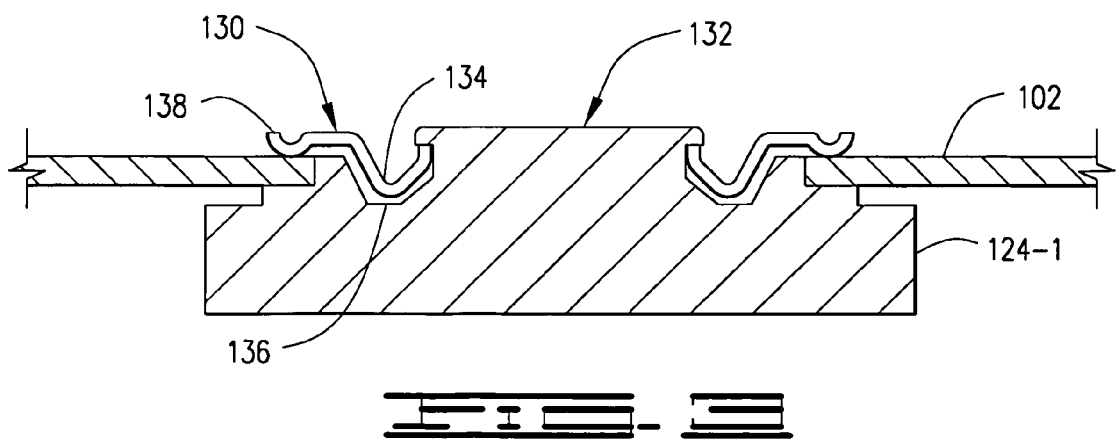

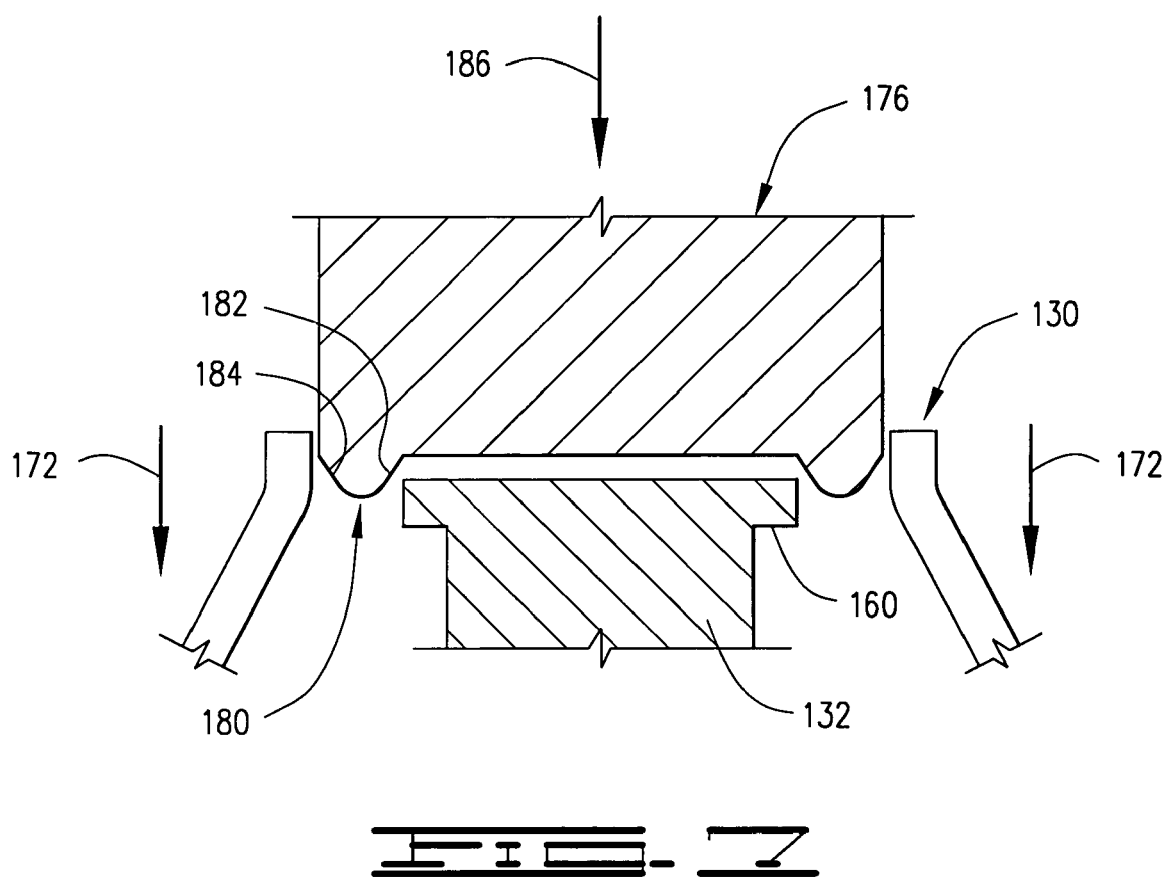

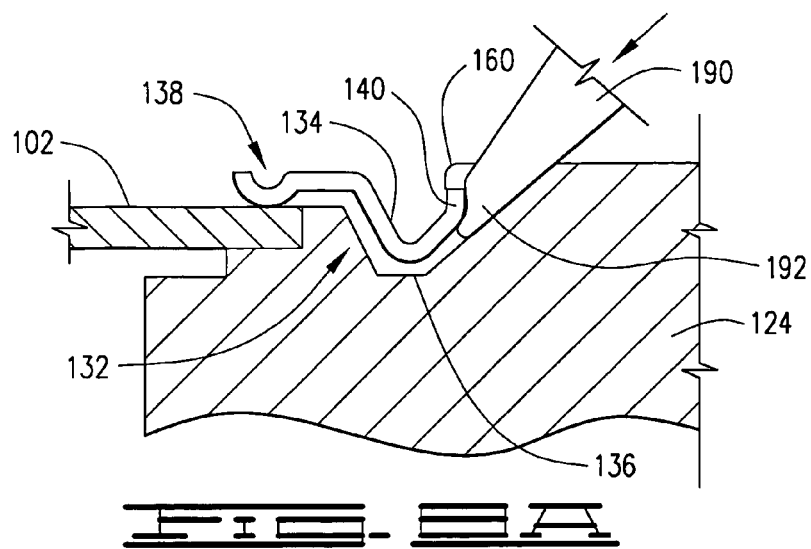
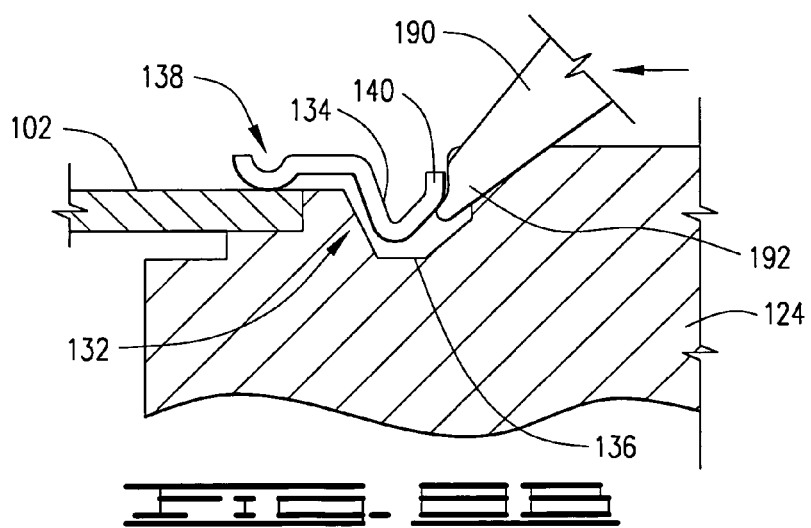
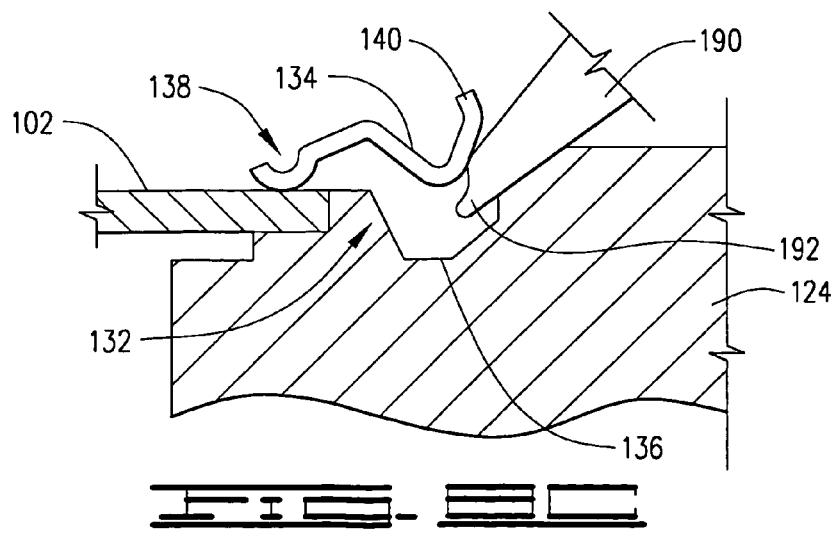

US 7,823,270 B2

CLAMP OR CLAMP ASSEMBLY HAVING A LOW PROFILE

FIELD OF THE INVENTION

The present invention relates generally to a clamp or clamp assembly, and more particularly but not by limitation to a clamp or clamp assembly for a data storage device.

BACKGROUND OF THE INVENTION

Data storage devices store digitally encoded information on discs. Heads, such as magnetoresistive, magneto-optical or inductive heads read data from or write to discs supported for rotation by a spindle assembly. The spindle assembly includes a hub portion and a spindle portion rotatable about the hub portion by a spindle motor. Discs are stacked on the spindle portion and secured to the spindle portion by a clamp. Spindle components including the clamp contribute to the profile height of the spindle assembly. In particular, prior clamps include a raised profile and are fastened with a screw or screws which increases the height or profile dimension of the spindle assembly. Reductions in form factor dimensions require lower profile heights for the spindle assembly and clamp. Embodiments of the present invention provide solutions to these and other problems, and offer other advantages over the prior art.

SUMMARY OF THE INVENTION

The present invention relates to a clamp including an inverted spring portion and a plurality of tabs about a circumference of an inner portion of the clamp. The inverted spring portion of the clamp is insertable into a groove of a clamping interface between a flange and an outer portion thereof to align the plurality of tabs proximate to the flange. As described, the clamp provides a low profile interface for clamping discs to a spindle assembly which snap fits into the groove to provide a screwless clamp interface. Other features and benefits that characterize embodiments of the present invention will be apparent upon reading the following detailed description and review of the associated drawings.

BRIEF DESCRIPTION OF THE DRAWINGS

FIG. 2 illustrates an embodiment of a clamp assembly of the prior art.

FIG. 3 illustrates an embodiment of a clamp assembly of the present invention.

FIGS. 6A and 6B progressively illustrate a clamping embodiment of the present invention.

FIG. 7 is a detailed illustration of an embodiment of a tool for assembling the clamp relative to the clamping interface.

FIGS. 8A through 8C progressively illustrate an embodiment for removing a clamp of the present invention.

DETAILED DESCRIPTION OF ILLUSTRATIVE EMBODIMENTS

Figure 1:
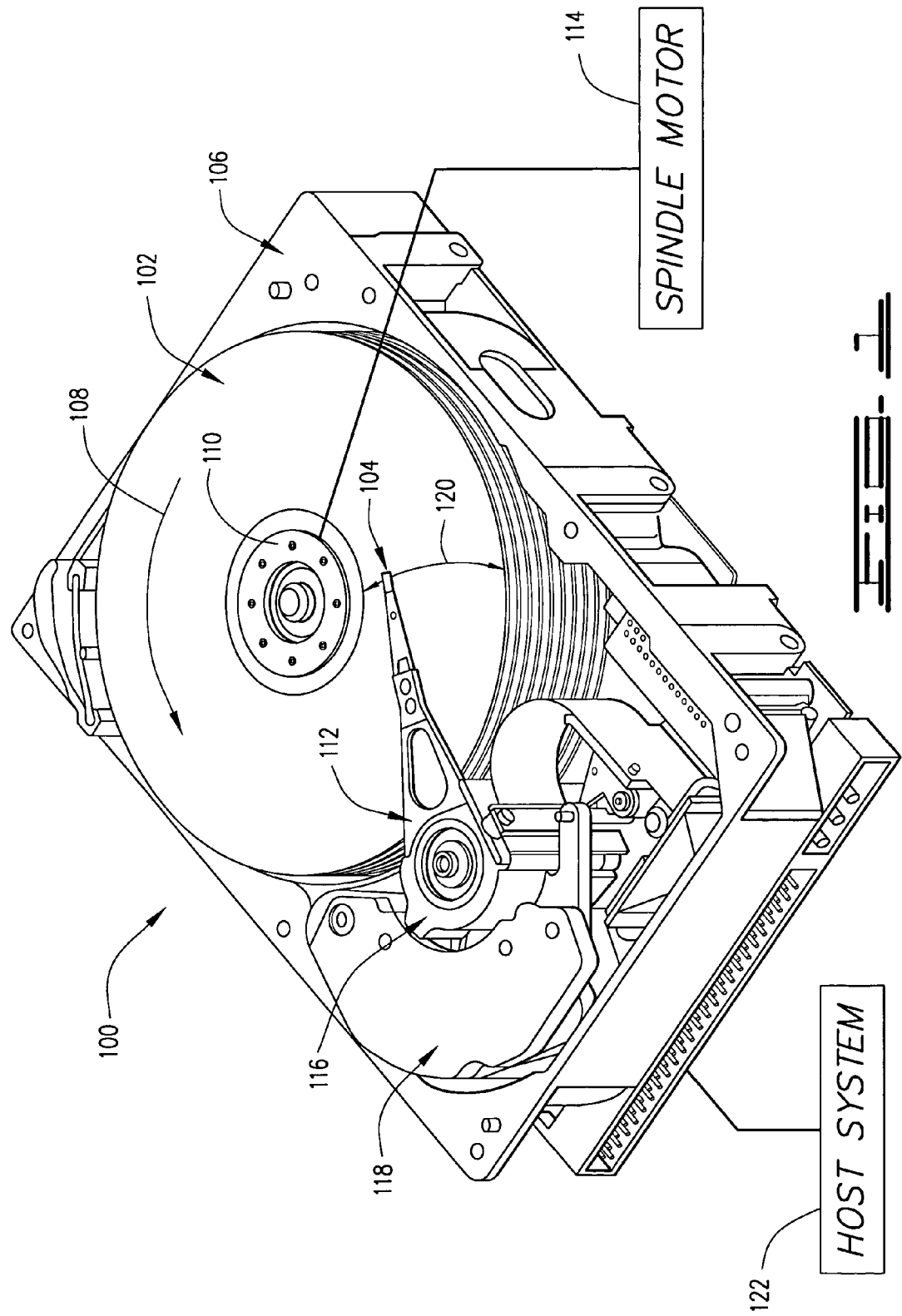
FIG. 1 is a perspective illustration of a data storage device including a clamp for a spindle assembly.

FIG. 1 is a perspective illustration of a data storage device 100 in which embodiments of the present invention are useful. As shown, the data storage device 100 includes discs 102 (or one disc) which store digital information. Heads 104 (such as for example, magnetoresistive, magneto-optical or inductive heads) read and/or write information to the discs 102. As shown, discs 102 are rotationally coupled to a base chassis 106 via a spindle assembly (not shown in FIG. 1) to rotate as illustrated by arrow 108 for read or write operations. Discs are secured to the spindle assembly via a disc clamp 110. Heads are coupled to an actuator assembly 112 to position the heads 104 relative to select data tracks on the disc to read data from or write data to the discs 102.

Discs are rotated by a spindle motor 114 (as schematically shown in FIG. 1) which is energized to rotate the discs for read and/or write operations. The actuator assembly 112 includes an actuator 116 which is rotated via operation of a voice coil motor (VCM) 118 to move the head or heads 104 as illustrated by arrow 120 relative to selected tracks on the disc 102 based upon commands or signals from a host computer or system 122 (illustrated schematically).

The spindle assembly includes a spindle portion 124 which may be rotationally coupled to a spindle hub (not shown) via a bearing assembly. Discs are clamped to the spindle portion 124 by an outer portion of a clamp 110-1 fastened to the spindle portion 124 as illustrated in FIG. 2. Prior embodiments of clamps as illustrated in FIG. 2 include a screw 126 to fasten the clamp to the spindle assembly. Form factor dimensions are decreasing, thus reducing the desired dimension or height of the spindle assembly. As previously described, prior clamp embodiments including a raised profile and fastened with a screw or screws have a relatively high height or profile dimension. The present invention relates to a clamp or clamp assembly which provides a low profile for spindle assemblies for data storage devices as described.

FIG. 3 illustrates an embodiment of a low profile clamp 130 and clamping interface 132 to provide a clamp assembly for discs 102 of a spindle assembly as illustrated in the previous FIGS. As shown, clamp 130 includes a clamp body including an inverted spring portion 134 which is seated in an inner groove 136 of the clamping interface 132 to provide a low profile interface. The clamp body includes an outer clamping portion 138 radially spaced from the inverted spring portion 134. In the illustrated embodiment, the clamp 130 secures a disc 102 relative to a spindle portion 124-1 of a spindle assembly which forms the clamping interface 132 of the clamping assembly.

Figure 4:
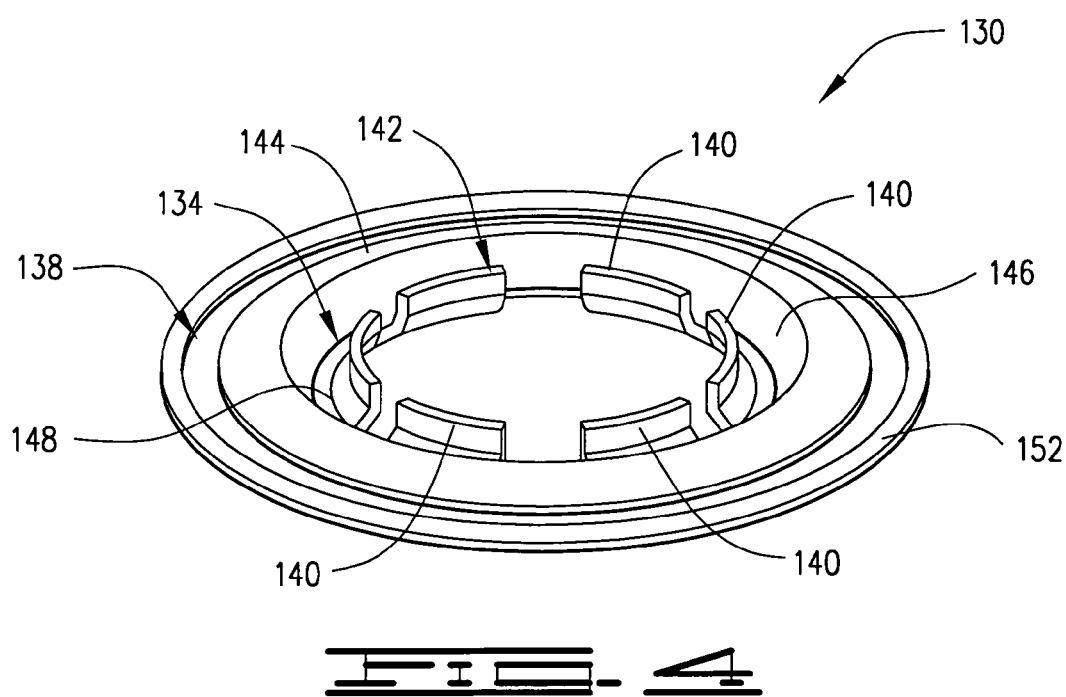
FIG. 4 is an illustration of an embodiment of a clamp of the clamp assembly of FIG. 3.

In the embodiment shown in FIG. 4, the clamp 130 includes a plurality of tabs 140 (four tabs are shown in the illustrated embodiment, although application is not limited to four tabs) about a circumference of the inner portion 142 of the clamp body. As shown, the clamp body includes an intermediate portion 144 between the inverted spring portion 134 and the outer clamping portion 138. As shown, the inverted spring portion 134 includes a sloped segment 146 and a recessed segment or surface 148 spaced from or below a surface of the intermediate portion 144 to form a channel about a circumference of the clamp body which is radially spaced from the intermediate portion 144 and the outer clamping portion 138. Tabs 140 extend from the recessed segment or surface 148 proximate to an inner diameter of the clamp. In the embodiment shown, the outer clamping portion 138 includes a ridge 152 about the circumference of the clamp 130. The ridge 152 forms a surface recessed from the intermediate portion 144 to clamp discs to a spindle portion of a spindle assembly as shown.

Figure 5:
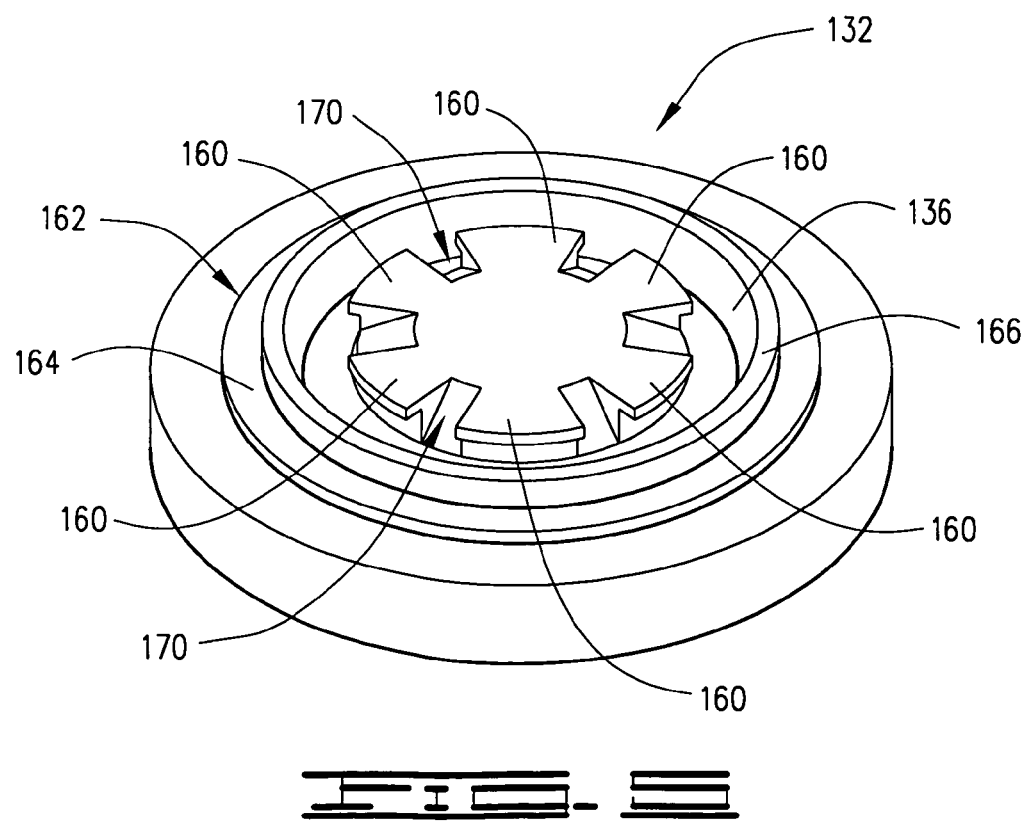
FIG. 5 illustrates an embodiment of a clamping interface for the embodiment of the clamp illustrated in FIG. 4.
Figure 5A:
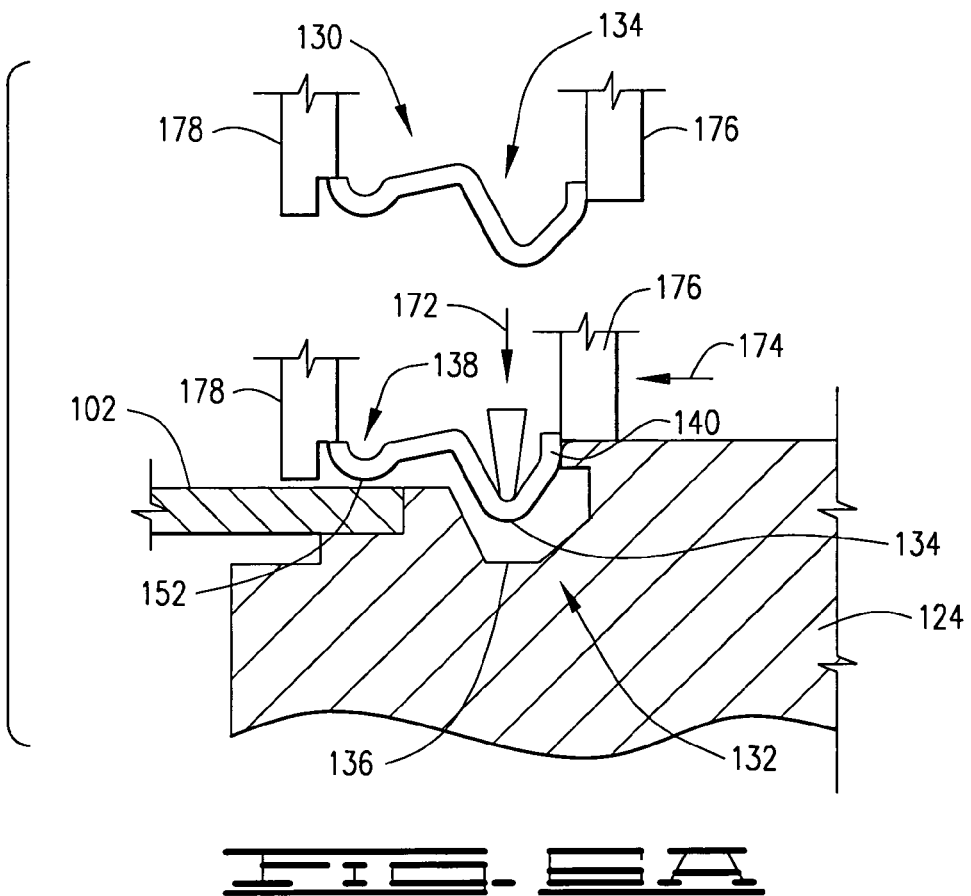
Figure 5B:
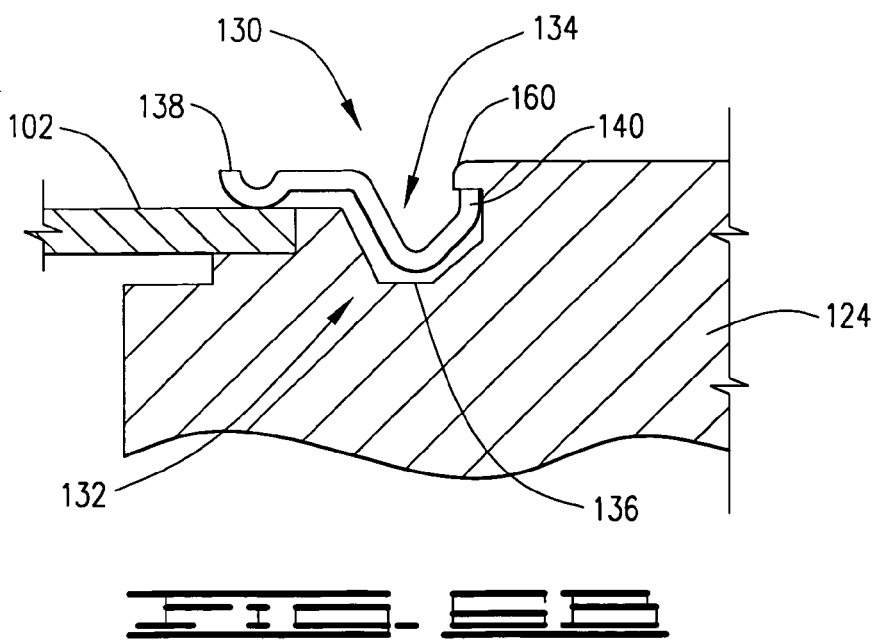

As previously described, clamp 130 is secured relative to a clamping interface 132. FIG. 5 illustrates an embodiment of a clamping interface 132 which includes a plurality of flange segments 160 about a circumference thereof proximate to groove 136 to form a flange for the clamp. The inverted spring portion 134 is seated in the groove 136 so that the tabs 140 abut a lower surface of the flange or flange segments 160 forming an edge surface of the groove (and raised above a recessed surface of the groove) to secure the clamp relative to the clamping interface 132. Tabs 140 are biased relative to the flange to provide a self centering clamp which is centered relative to the clamping interface 132. The inverted spring portion 134 is disposed in groove 136 so that tabs 140 snap under the flange to provide a screwless interface to secure the clamp and provide a relatively low profile for application for a spindle motor or spindle assembly for a data storage device.

In the embodiment shown, an outer portion 162 of the clamping interface 132 includes a ledge 164 and outer edge surface 166 to form a post for the spindle portion of a spindle assembly. Outer portion 162 is radially spaced from the groove 136 so that a disc or discs supported on ledge 164 are clamped relative to the outer clamping portion 138 of the clamp secured to the spindle assembly via the inverted spring portion 134 and tabs 140 thereof. As shown, the flange includes a plurality of slots 170 (or at least one slot) between spaced flange segments 160. The slots 170 (six slots are shown in the illustrated embodiment although application is not so limited) are aligned to abut the spaced tabs 140 of the clamp to remove the clamp 130 from the clamping interface 132 or spindle assembly.

For assembly, a force is supplied to the inverted spring portion 134 to snap the inverted spring portion into the groove 136 and snap tabs 140 under the raised flange or flange segments 160 to clamp to the clamping interface 132. In particular, as illustrated in FIGS. 6A through 6B force is supplied (by an assembly tool) as illustrated by arrow 172 and an inner portion of the clamp is biased outwardly as illustrated by arrow 174 via assembly tool 176 to snap the inverted spring portion into the groove 136 and the tabs proximate to (or tip of tabs under) the flange or flange segments 160. In the embodiment shown, the outer clamping portion 138 of the clamp is biased proximate to the clamping interface 132 via assembly tool 178 to assemble clamp 130 relative to the clamping interface 132 as illustrated in FIG. 6B.

In the illustrated embodiment, assembly tools 176 and 178 engage the clamp 130 to position the clamp 130 proximate to the clamping interface 132. The inner assembly tool 176 expands the inner portion and tabs of the clamp 130 outwardly and force 172 is supplied to snap the clamp 130 into place. The clamping interface 132 or spindle assembly is spring loaded to absorb force of the assembly tool. Inner and outer assembly tools 176, 178 are floatably supported for self-centering of the clamp 130 relative to the flange or clamping interface 132. In one embodiment illustrated in FIG. 7 (shown greatly exploded), the inner tool 176 includes a contoured tip 180 which has a larger diameter than or "overhangs" the clamping interface 132. As shown the contoured tip 180 includes an inner contoured portion 182 and an outer contoured portion 184. As illustrated by arrow 186, inner tool 176 is lowered or advanced towards the clamping interface 132 to assemble the clamp 130. As the tool 176 is lowered, contoured surface of portion 184 engages the clamp 130 to expand the clamp or tabs 140. Thereafter force 172 is supplied to lower the clamp into groove 136 of the clamping interface so that the clamp springs or snaps into place proximate to the flange or flange segments 160. As shown, the inner and outer contoured portions 182, 184 provide a contoured surface proximate to the clamping interface 132 and clamp 130 to prevent damage or scratches to the clamping interface 132 or spindle assembly and clamp 130 as the clamp is forced into the groove 136.

FIGS. 8A through 8B progressively illustrate removal of the clamp using a removal tool 190. As shown, finger 192 proximate to a tip of the removal tool is aligned with the slot 170 between flange segments 160 to engage the clamp or tabs 140 to provide a force (slightly downward and outwards) to snap out or release the tabs 140 out from under the flange or flange segments 160 to remove the clamp from groove 136 as shown. In particular, the finger 192 first engages the clamp to push it slightly downwards to prevent scratching the spindle assembly or clamping interface 132 during the outward movement.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a particular application or data storage system, it will be appreciated by those skilled in the art that the teachings of the present invention can be applied to embodiments or systems, without departing from the scope and spirit of the present invention.

What is claimed is:

1. A method comprising:
    supplying an outward force in a first direction via contacting engagement with an assembly tool against an inner portion of a clamp to enlarge an opening defined by the clamp; and
    supplying a clamping force in a second direction generally transverse to the first direction to disengage the inner portion of the clamp from the assembly tool, thereby reducing the opening to install the clamp over a flange of a clamping interface.

2. The method of claim 1 and further comprising:
    engaging the inner portion of the clamp through a slot between flange segments of the clamping interface; and
    applying a force to the inner portion of the clamp to remove the clamp from the clamping interface.

3. The method of claim 1 and comprising:
    aligning a tool relative to a slot between flange segments of the clamping interface;
    engaging a portion of the clamp with the tool through the slot; and
    using the tool to remove the clamp.

4. The method of claim 3 wherein the clamp includes a plurality of tabs and engaging the portion of the clamp with the tool engages at least one of the plurality of tabs.

5. The method of claim 1 wherein supplying the outward force comprises:
    engaging the inner portion of the clamp along a sloped surface of the assembly tool to supply the outward force in the first direction to the inner portion of the clamp prior to supplying the clamping force.

6. The method of claim 5 wherein the clamp includes a plurality of tabs spaced about an inner circumference of the clamp and the assembly tool engages one or more of the plurality of tabs to bias an inverted spring portion of the clamp outwardly to install the clamp over the flange of the clamping interface.

7. The method of claim 5 wherein the supplying the clamping force is characterized by:
   releasing the clamp from the assembly tool to snap fit the clamp into a groove of the clamping interface by supplying the clamping force step.

8. The method of claim 1 wherein the clamping interface is formed on a spindle assembly and comprising:
   loading one or more discs on the spindle assembly prior to supplying the clamping force to install the clamp.

9. The method of claim 1 and comprising:
   supplying the outward force to the inner portion of the clamp prior to supplying the clamping force.

10. The method of claim 1 and comprising:
    supporting at least one disc on a ledge surface of the clamping interface; and
    snap fitting the clamp into a groove of the clamping interface having a surface recessed below the ledge surface of the clamping interface by the supplying the clamping force step.

11. A method comprising;
    supplying an outward force in a first direction to an inner portion of a clamp via an assembly tool; and
    releasing the clamp from the assembly tool by supplying a clamping force in a second direction towards a clamping interface, where the second direction is different from the first direction to install the clamp into a recessed groove of the clamping interface.

12. The method of claim 11 wherein the releasing step comprises:
    snap fitting an inverted spring portion of the clamp into the recessed groove of the clamping interface.

13. The method of claim 11 and comprising the step of:
    positioning the clamp proximate to the clamping interface prior to supplying the clamping force.

14. The method of claim 11 wherein the second direction is generally transverse to the first direction.

15. The method of claim 11 wherein the step of supplying the outward force comprises moving the assembly tool in the second direction to engage the inner portion of the clamp along a sloped surface of the assembly tool to supply the outward force to the inner portion of the clamp in the first direction.

16. The method of claim 11 and comprising engaging an outer portion of the clamp and supplying the clamping force in the second direction to an intermediate portion of the clamp spaced from inner and outer edges of the clamp.

17. A method comprising:
    positioning a clamp proximate to a spindle assembly;
    supplying an outward force in a first direction to an inner portion of the clamp;
    supplying a clamping force in a second direction to the clamp along an inverted portion of the clamp spaced from inner and outer edges of the clamp, where the second direction is different from the first direction and in a direction towards the spindle assembly; and
    installing the inverted portion of the clamp into a recessed groove of the spindle assembly.

18. The method of claim 17 comprising:
    installing one or more discs on the spindle assembly prior to supplying the clamping force.

19. The method of claim 17 wherein the first direction is generally transverse to the second direction.

20. The method of claim 17 wherein the outward force is supplied via an assembly tool movable in the second direction toward the spindle assembly.

* * * * *